United States Patent
Inagaki et al.

(10) Patent No.: US 8,728,670 B2
(45) Date of Patent: May 20, 2014

(54) NONAQUEOUS-ELECTROLYTE BATTERY CONTAINING A NEGATIVE ELECTRODE WITH A COATING FILM FORMED BY AN ISOCYANATE-CONTAINING COMPOUND IN THE NONAQUEOUS ELECTROLYTE

(75) Inventors: Hiroki Inagaki, Yokohama (JP); Norio Takami, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 450 days.

(21) Appl. No.: 12/196,684

(22) Filed: Aug. 22, 2008

(65) Prior Publication Data

US 2009/0061303 A1   Mar. 5, 2009

(30) Foreign Application Priority Data

Aug. 23, 2007   (JP) .................. 2007-217353

(51) Int. Cl.
H01M 10/0525 (2010.01)
H01M 10/0564 (2010.01)
H01M 10/0566 (2010.01)
H01M 10/0567 (2010.01)

(52) U.S. Cl.
USPC ........... 429/339; 429/188; 429/324; 429/325; 429/326; 429/341

(58) Field of Classification Search
USPC ................. 429/199, 188, 324, 326, 339, 341
See application file for complete search history.

(56) References Cited

U.S. PATENT DOCUMENTS 6,083,644 A * 7/2000 Watanabe et al. .......... 429/231.1
2002/0172860 A1   11/2002 Lilia et al.
2007/0072080 A1 * 3/2007 Inagaki et al. ............. 429/231.1
2007/0212608 A1 * 9/2007 Liu et al. .................... 429/231.1
2010/0283429 A1 * 11/2010 Ofer et al. ...................... 320/128

FOREIGN PATENT DOCUMENTS

| CN | 1416189 A | 5/2003 |
| CN | 1941459 A | 4/2007 |
| DE | 10042149 A1 * | 5/2001 |
| DE | 100 16 024 | 10/2001 |
| JP | 8-102332 | 4/1996 |
| JP | 9-199179 | 7/1997 |
| JP | 10-312826 A | 11/1998 |
| JP | 2001-210324 | 8/2001 |
| JP | 2001-313030 | 11/2001 |
| JP | 2002-8719 | 1/2002 |
| JP | 2002008719 A * | 1/2002 |
| JP | 2003-217587 | 7/2003 |
| JP | 2004-87229 A | 3/2004 |
| JP | 2004-296325 | 10/2004 |

(Continued)

OTHER PUBLICATIONS

Machine translation of JP 2005259641 A, Tasaka et al., Sep. 2005.*

(Continued)

Primary Examiner — Sean P Cullen (74) Attorney, Agent, or Firm — Oblon, Spivak, McClelland, Maier & Neustadt, L.L.P.

(57) ABSTRACT

The invention provides a nonaqueous-electrolyte battery which has a positive electrode 3 including a positive active material, a negative electrode 4 including a negative active material having a lithium insertion/release potential higher than 1.0V (vs. Li/Li$^+$), and a nonaqueous electrolyte, wherein an organic compound having one or more isocyanato groups has been added to the nonaqueous electrolyte.

19 Claims, 4 Drawing Sheets

(56) References Cited

FOREIGN PATENT DOCUMENTS

| JP | 2005259641 A | * | 9/2005 |
|----|--------------|---|--------|
| JP | 2006-156032 A | | 6/2006 |
| JP | 2006-164759 | | 6/2006 |
| JP | 3866740 | | 10/2006 |
| JP | 2007-73382 | | 3/2007 |

OTHER PUBLICATIONS

Machine translation of DE 10042149 A1, Schmidt et al., May 2001.*
Hibara, A., Machine translation of JP 2002-008719 A, Jan. 2002.*
Office Action issued Feb. 16, 2011, in China Patent Application No. 200810145999.3 (with English translation).
EPO Machine Translation of DE 10042149.
Robert A. Huggins, "Lithium alloy negative electrodes", Journal of Power Sources 81-81 (1999) 13-19.
C. John Wen, et al., "Electrochemical Investigation of the Lithium—Gallium System", J. Electrochem. Soc.: Electrochemical Science and Technology, Aug. 1981, vol. 128, No. 8, pp. 1636-1641.
Chinese Office Action issued Oct. 30, 2012 in Patent Application No. 200810145999.3 with English Translation.
Chinese Office Action issued Apr. 25, 2012 in Patent Application No. 200810145999.3 with English Translation.
Chinese Office Action issued Jan. 5, 2012 in Patent Application No. 200810145999.3 with English Translation.
Office Action issued Jun. 15, 2012 in Japanese Application No. 2007-217353 (With English Translation).
Office Action issued Oct. 18, 2013 in Japanese Patent Application No. 2012-281713 with English language translation.

* cited by examiner

COATING FILM

FIG. 5

FIG. 6

# NONAQUEOUS-ELECTROLYTE BATTERY CONTAINING A NEGATIVE ELECTRODE WITH A COATING FILM FORMED BY AN ISOCYANATE-CONTAINING COMPOUND IN THE NONAQUEOUS ELECTROLYTE

CROSS-REFERENCE TO RELATED APPLICATIONS

This application is based upon and claims the benefit of priority from the prior Japanese Patent Application No. 2007-217353, filed on Aug. 23, 2007, the entire contents of which are incorporated herein by reference.

BACKGROUND OF THE INVENTION

1. Field

The present invention relates to a nonaqueous-electrolyte battery.

2. Description of the Related Art

Nonaqueous-electrolyte batteries which are charged/discharged based on the movement of lithium ions between the negative electrode and positive electrode are being extensively investigated and developed as batteries having a high energy density. Nonaqueous-electrolyte batteries employing a lithium-transition metal composite oxide as a positive active material and a carbonaceous substance as a negative active material have already been commercialized.

On the other hand, nonaqueous-electrolyte batteries employing a material having a higher lithium insertion/release potential than carbonaceous substances, such as, e.g., a lithium-titanium composite oxide (about 1.55 V vs. Li/Li$^+$), as a negative active material are being investigated in recent years (see, for example, Japanese Patent No. 3866740 and JP-A 9-199179). Lithium-titanium composite oxides change little in volume with charge/discharge and hence have excellent cycle characteristics. Such nonaqueous-electrolyte batteries are theoretically free from lithium metal deposition and can hence be charged at a high current.

It was found that in the battery employing such a material having a high lithium insertion/release potential, e.g., a lithium-titanium composite oxide, as a negative active material, a reaction accompanied by gas evolution occurs within the battery due to the battery reactions or during long-term storage. Due to this reaction, the battery deteriorates in battery characteristics such as high-current characteristics and self-discharge characteristics.

BRIEF SUMMARY OF THE INVENTION

The invention may provide a nonaqueous-electrolyte battery which comprises a case, a positive electrode held in the case, a negative electrode held in the case and including a negative active material having a lithium insertion/release potential higher than 1.0 V (vs. Li/Li$^+$), and a nonaqueous electrolyte packed in the case, the nonaqueous electrolyte being liquid at ordinary temperature and comprising a nonaqueous solvent, an electrolyte material and at least one organic compound having one or more isocyanato groups having been added to the nonaqueous electrolyte.

According to the embodiments of the invention, a nonaqueous-electrolyte battery employing a material having a high lithium insertion/release potential as a negative active material is provided which is inhibited from undergoing a gas-evolving reaction, has enhanced safety, and further has satisfactory battery characteristics.

DETAILED DESCRIPTION OF THE INVENTION

The gas evolution phenomenon in the related-art nonaqueous-electrolyte batteries employing a material having a high lithium insertion/release potential, e.g., a lithium-titanium composite oxide, as a negative active material is more marked than in conventional nonaqueous-electrolyte batteries employing a carbonaceous substance in the negative electrode. It is thought that there are two causes of gas evolution in the former batteries.

One is the gas evolution occurring in the case where the positive active material of the positive electrode contains a transition metal element. In this case, the transition metal element partly dissolves away in the nonaqueous electrolyte, deposits on the surface of the negative electrode, and reacts with the electrolyte on the negative-electrode surface to evolve a gas. Especially when the positive electrode employs manganese and manganese ions have dissolved away, then the manganese accelerates the decomposition of the electrolyte on the surface of the negative electrode to cause considerable gas evolution. Positive electrodes containing iron are the same as the manganese-containing positive electrode. The dissolution of a transition metal element is further accelerated as the amount of water contained in the electrolyte increases.

The other is the gas evolution occurring as a result of the reaction of the negative active material with the electrolyte on the surface of the negative electrode.

The present inventors diligently made investigations. As a result, they have found that the gas evolution occurring by those mechanisms can be significantly inhibited by using an organic compound having one or more isocyanato groups as an additive for a nonaqueous electrolyte.

Nonaqueous-electrolyte batteries contain water therein which is derived from a constituent member or has unavoidably come thereinto during a production step. The water contained reacts with the lithium salt contained in the nonaqueous electrolyte, such as, e.g., LiBF$_4$ or LiPF$_6$, to generate hydrofluoric acid. This hydrofluoric acid acts on the positive active material to undesirably dissolve away the transition metal element as a positive-electrode constituent element. The transition metal ions formed by the dissolution move to and deposit on the negative electrode. This deposited transition metal not only evolves a gas through the decomposition of the electrolyte but also considerably reduces negative-electrode performances, i.e., battery performances. Manganese ions antagonize the lithium insertion/release potential of a lithium-titanium composite oxide and, hence, the deposit of manganese is not stable and induces continuous gas evolution. In the case of positive electrodes containing iron also, continuous gas evolution was observed as in the case of manganese-containing ones.

As a technique for removing such water contained, there is a method in which activated alumina or the like is added to physically adsorb the water. However, this method has drawbacks that the water-removing effect is low and the water once adsorbed is released again with increasing temperature.

On the other hand, in the case where an organic compound having one or more isocyanato groups is added to a nonaqueous electrolyte, this compound rapidly reacts with the water present within the battery according to the following formula (5). Namely, the compound has the function of removing the water contained in the electrolyte. Thus, the transition metal contained in the positive active material is inhibited from dissolving away, and this leads to inhibition of the gas evolution described above and inhibition of the deterioration of negative-electrode performances.

(5)

The compound having one or more amino groups which is formed by the reaction is present stably within the battery. Part of this amino compound is incorporated in the electrolyte and other part forms a thin and dense stabilizing coating film on the surface of the negative electrode to have the effect of inhibiting the negative active material from reacting with the nonaqueous electrolyte on the negative-electrode surface to evolve a gas or inhibiting the negative electrode from suffering self-discharge. The stabilizing coating film does not serve as an excessively resistive component and a battery having satisfactory high-current characteristics is obtained. It is therefore desirable that both the organic compound having one or more isocyanato groups and the organic compound having one or more amino groups generated by addition of that compound should be present in the battery from the standpoint of maintaining battery performances over long.

Even in the case where no transition metal element is contained as a positive active material, not to mention the case where a transition metal element is contained as a positive active material, the amino compound functions to inhibit the negative electrode from reacting with the nonaqueous electrolyte and thereby evolving a gas or to form a stabilizing coating film on the surface of the negative electrode and thereby maintain high-current discharge characteristics and inhibit self-discharge.

The organic compound having one or more isocyanato groups has a reduction potential of about 0.9 V (vs. Li/Li$^+$). Because of this, one of the functions according to the embodiments of the invention obtained when a negative active material which acts on lithium at a potential higher than 1.0 V (vs. Li/Li$^+$) is not attained when a conventional negative electrode made of carbon is used. If an organic compound having one or more isocyanato groups is added to a battery employing a conventional negative electrode made of carbon, the organic compound having one or more isocyanato groups is reduced and decomposed during the first charge although effective in removing water. The resultant by-products of the reduction foul the surface of the negative electrode to considerably reduce battery performances such as charge/discharge cycle performance and high-current performance.

Embodiments of the invention are explained below by reference to the drawings. In the embodiments, like members or parts are designated by like numerals or signs, and duplicates of explanation are omitted. The drawings are diagrammatic views for illustrating the embodiments of the invention and facilitating the understanding thereof. Although each drawing includes parts differing in shape, dimension, ratio, etc. from those in an actual device, the designs of such parts can be suitably modified while taking account of the following explanation and known techniques.

Figure 1:
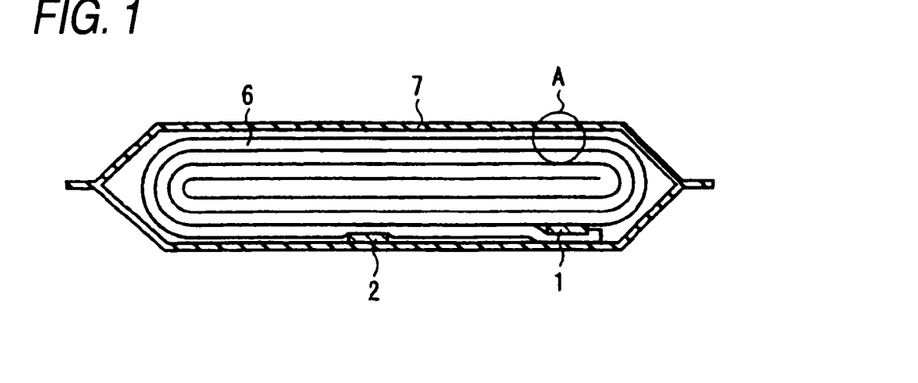
FIG. 1 is a diagrammatic sectional view of a flat type nonaqueous-electrolyte secondary battery according to an embodiment of the invention.
Figure 2:
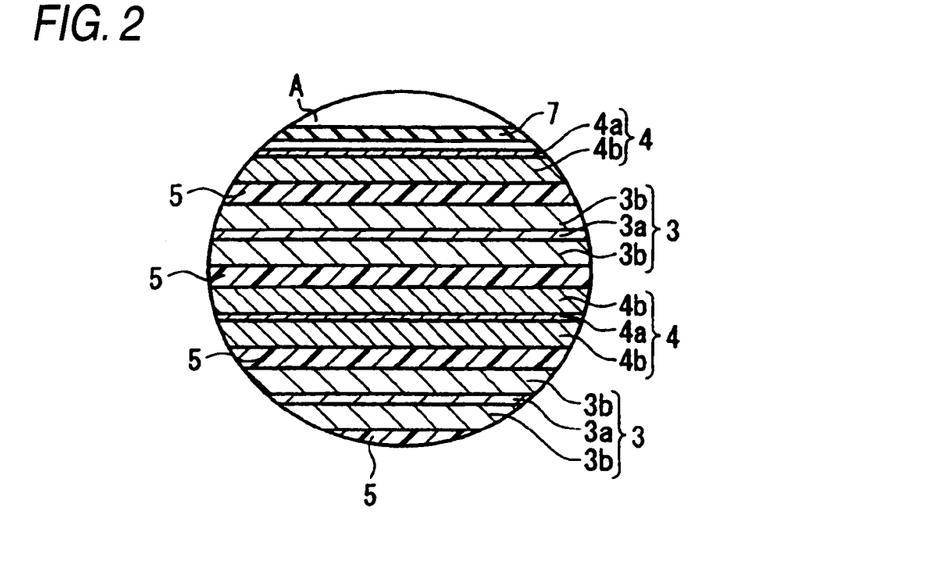
FIG. 2 is a diagrammatic sectional view showing in detail that part in FIG. 1 which is surrounded by the circle A.

The structure of one embodiment of battery cells is explained by reference to FIG. 1 and FIG. 2. In FIG. 1 is shown a diagrammatic sectional view of a flat type nonaqueous-electrolyte secondary battery according to a first embodiment. FIG. 2 is a diagrammatic sectional view showing in detail that part in FIG. 1 which is surrounded by the circle A.

A positive electrode 3 has a positive-electrode terminal 1 bonded thereto, and a negative electrode 4 has a negative-electrode terminal 2 bonded thereto. The positive electrode 3 and the negative electrode 4 are wound through separators 5 to constitute flat wound electrodes 6. The wound electrodes 6 are packed in a case 7 filled with a nonaqueous electrolyte.

As shown in FIG. 1, the flat wound electrodes 6 are held in the case 7 filled with a nonaqueous electrolyte. In a part near the peripheral end of the wound electrodes 6, the negative-electrode terminal 2 and the positive-electrode terminal 1 are bonded on the outer side and inner side, respectively. The wound electrodes 6 have a multilayer constitution composed of the negative electrode 4, separator 5, positive electrode 3, and separator 5 stacked in this order from the outer side.

The constitution of the wound electrodes 6 is explained in more detail. As shown in FIG. 2, the positive electrode 3 and the negative electrode 4 are disposed in a multilayer arrangement through separators 5. The negative electrode 4 in an outermost part thereof has a multilayer constitution composed of a negative-electrode current collector 4a and a negative-electrode layer 4b in this order from the outer side, while the other part of the negative electrode 4 has a multilayer constitution composed of a negative-electrode layer 4b, a negative-electrode current collector 4a, and a negative electrode layer 4b in this order. The positive electrode 3 has a multilayer constitution composed of a positive-electrode layer 3b, a positive-electrode current collector 3a, and a positive-electrode layer 3b in this order.

The negative electrode, nonaqueous electrolyte, positive electrode, separators, case, positive-electrode terminal, and negative-electrode terminal are explained below in detail.

1) Negative Electrode

The negative active material is a negative active material having a lithium insertion/release potential higher than 1.0 V (vs. Li/Li$^+$). A lithium-titanium composite oxide is especially preferred. The lithium-titanium composite oxide inserts lithium at about 1.55 V (vs. Li/Li$^+$). Because of this, the organic isocyanato compound added to the electrolyte is not excessively reduced or decomposed, and the amino compound formed by a dehydration reaction is also inhibited from being decomposed. Besides the lithium-titanium composite oxide, examples of the negative active material include lithium-niobium composite oxides having a lithium insertion/release potential of 1-2 V (vs. Li/Li$^+$), such as Li$_x$Nb$_2$O$_5$ and Li$_x$NbO$_3$, lithium-molybdenum composite oxides having a lithium insertion/release potential of 2-3 V (vs. Li/Li$^+$), such as Li$_x$MoO$_3$, and lithium-iron composite sulfides having a lithium insertion/release potential of 1.8 V (vs. Li/Li$^+$), such as Li$_x$FeS$_2$.

In case where a substance which inserts lithium at a potential lower than the decomposition potential of that compound, e.g., a potential lower than 1.0 V (vs. Li/Li$^+$), such as, e.g., a carbonaceous substance, is used as a negative active material, application of the electrolyte according to the embodiments of the invention results in the excessive reduction/decomposition of the compound having one or more isocyanato groups or amino groups contained in the electrolyte. As a result, an excessively high-resistance coating film is formed on the surface of the negative electrode to considerably reduce battery performances. In addition, the excessive decomposition reactions of those compounds themselves evolve a large amount of gases to deform the battery.

Examples of the lithium-titanium composite oxide include lithium-titanium oxides such as $Li_{4+x}Ti_5O_{12}$ ($0 \leq x \leq 3$) and $Li_{2+y}Ti_3O_7$ ($0 \leq y \leq 3$) and lithium-titanium composite oxides obtained by partly replacing the constituent elements of such lithium-titanium oxides with one or more other elements.

Furthermore, substances such as $TiO_2$ and a titanium composite oxide including titanium and at least one element selected from the group consisting of P, V, Sn, Cu, Ni, Co, and Fe are also usable as the negative electrode in the embodiments of the invention. These substances insert lithium during the first charge to become lithium-titanium composite oxides. The $TiO_2$ preferably is an anatase-form one which has undergone a heat treatment at a temperature of 300-500° C. and has low crystallinity. Examples of the metal composite oxide including titanium and at least one element selected from the group consisting of P, V, Sn, Cu, Ni, Co, and Fe include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, Co, and Fe). This metal composite oxide preferably has a microstructure in which a crystalline phase and an amorphous phase coexist or an amorphous phase alone exists. Use of the metal composite oxide having such a microstructure can greatly improve cycle performance. Preferred of the substances shown above are the lithium-titanium oxides and the metal composite oxide including titanium and at least one element selected from the group consisting of P, V, Sn, Cu, Ni, Co, and Fe.

It is desirable that the negative active material should be regulated so as to have an average particle diameter of 1 μm or smaller. However, too small average particle diameters thereof may result in a possibility that the nonaqueous electrolyte might be distributed mainly on the negative-electrode side and the positive electrode might become deficient in the electrolyte material. Consequently, the lower limit of the average particle diameter thereof is preferably 0.001 μm.

It is desirable that the negative active material should have an average particle diameter of 1 μm or smaller and a specific surface area as determined by the $N_2$ adsorption BET method in the range of 5-50 $m^2/g$. The infiltration of the nonaqueous electrolyte can hence be enhanced.

The effects of the embodiments of the invention are enhanced as the specific surface area of the negative active material increases. This is because the lithium-titanium composite oxide has a high affinity for water and the amount of water which can be brought into the cell by the composite oxide increases as the specific surface area thereof becomes larger.

The porosity of the negative electrode (excluding the current collector) is desirably regulated to a value in the range of 20-50%. Thus, the negative electrode can have an excellent affinity for the nonaqueous electrolyte and a high density. A more preferred range of the porosity of the negative electrode is 25-40%.

The density of the negative electrode is desirably regulated to 2 g/cc or higher. This is because negative-electrode densities lower than 2 g/cc may result in a possibility that it might be impossible to obtain a negative electrode having the porosity described above. A more preferred range of the density of the negative electrode is 2-2.5 g/cc.

The negative-electrode current collector preferably is an aluminum foil or an aluminum alloy foil. It is preferred that the negative-electrode current collector should have an average crystal grain diameter of 50 μm or smaller. This current collector can have greatly enhanced strength and, hence, the negative electrode can be highly densified by pressing at a high pressure. An increase in battery capacity can hence be attained. Furthermore, this current collector can be prevented from suffering dissolution/corrosion deterioration in overdischarge cycling in a high-temperature atmosphere (40° C. or higher) and can hence inhibit negative-electrode impedance from increasing. In addition, output characteristics, suitability for rapid charge, and charge/discharge cycle characteristics can also be improved. A more preferred range of the average crystal grain diameter of the negative-electrode current collector is up to 30 μm, and an even more preferred range thereof is up to 5 μm.

The average crystal grain diameter is determined in the following manner. The structure in a surface of the current collector is examined with an optical microscope, and the number n of crystal grains present in an area of 1 mm×1 mm is determined. This value of n is used to determine the average crystal grain area S using the equation $S=1\times10^6/n$ ($\mu m^2$). From the value of S obtained, the average crystal grain diameter d (μm) is calculated using the following equation (1).

$$d=2(S/\pi)^{1/2} \qquad (1)$$

The aluminum foil or aluminum alloy foil having an average crystal grain diameter in the range up to 50 μm is complicatedly influenced by many factors including material composition, impurities, processing conditions, heat treatment history, and heating conditions in annealing. The crystal grain diameter is regulated in production steps by combining those factors.

The thickness of the aluminum foil or aluminum alloy foil may be 20 μm or smaller, and is more preferably 15 μm or smaller. The aluminum foil preferably has a purity of 99% or higher. The aluminum alloy preferably is an alloy containing an element such as magnesium, zinc, or silicon. On the other hand, the content of transition metals such as iron, copper, nickel, and chromium is preferably regulated to 1% or lower.

A conductive material can be incorporated into a layer containing the negative active material. As the conductive material, use can be made of, for example, a carbon material, a metal powder such as an aluminum powder, or a conductive ceramic such as TiO. Examples of the carbon material include acetylene black, carbon black, coke, carbon fibers, and graphite. More preferred are a powder of coke, graphite, or TiO which has undergone a heat treatment at a temperature of 800-2,000° C. and has an average particle diameter of 10 μm or smaller and carbon fibers having an average diameter of 1 μm or smaller. The carbon material preferably has a BET specific surface area as determined through $N_2$ adsorption of 10 $m^2/g$ or larger.

A binder can be incorporated into the layer containing the negative active material. Examples of the binder include polytetrafluoroethylene (PTFE), poly(vinylidene fluoride) (PVdF), fluororubbers, styrene/butadiene rubbers, and core/shell binders.

With respect to the ratio in which the negative active material, negative-electrode conductive material, and binder are mixed together, the proportion of the negative active material is preferably in the range of from 70% by weight to 96% by weight and that of the negative-electrode conductive material is preferably in the range of from 2% by weight to 28% by weight. Furthermore, the proportion of the binder is preferably in the range of from 2% by weight to 28% by weight. In case where the proportion of the negative-electrode conductive material is smaller than 2% by weight, the layer containing the negative active material has a reduced current-collecting ability, resulting in a possibility that the nonaqueous-electrolyte secondary battery might have reduced high-current characteristics. In case where the proportion of the binder is smaller than 2% by weight, the layer containing the negative active material shows reduced adhesion to the negative-electrode current collector, resulting in a possibility that cycle characteristics might decrease. On the other hand, from the standpoint of increasing capacity, the proportions of the negative-electrode conductive material and the binder are preferably up to 28% by weight each.

The negative electrode is produced, for example, by suspending the negative active material, negative-electrode conductive material, and binder in a solvent in common use to prepare a slurry, applying the slurry to a negative-electrode current collector, drying the coating to form a layer containing the negative active material, and then pressing the resultant structure. The slurry preparation in this procedure may be conducted in the following manner. First, the negative active material, negative-electrode conductive material, and binder are added to a small amount of a solvent. The resultant mixture in the state of having a high solid proportion (the proportion of the negative active material, negative-electrode conductive material, and binder to the solvent is high) is kneaded with a planetary mixer or the like to apply a high shear force thereto and thereby evenly disperse the solid ingredients. In this operation, in case where the solid proportion is not sufficiently high, the shear force which can be applied is low and the negative active material which has aggregated cannot be sufficiently pulverized. The solid ingredients are not evenly dispersed in this case. The importance of this step becomes higher as the particle diameter of the negative active material becomes smaller. When particles having an average particle diameter of 1 µm or smaller are handled, that step is especially important. After the mixture in the state of having a high solid proportion has been sufficiently kneaded, a solvent is added thereto to gradually lower the solid proportion and regulate the resultant slurry so as to have a viscosity preferable for application. This slurry having a viscosity preferable for application is further sufficiently mixed by means of a bead mill using ceramic balls as a medium. Through this step, edges of the active-material particles are rounded, and the active-material particles come to have a smooth surface. The active-material particles thus treated can be packed at a high density and bring about an average pore diameter of a pore diameter distribution shifted to the smaller-diameter side. Thus, a negative electrode having the pore diameter distribution described in regard to this embodiment is obtained. The ceramic balls to be used can be made of any of various materials including glass, alumina, mullite, and silicon nitride. However, balls made of zirconia are preferred from the standpoints of wearing resistance and impact resistance. The diameter of the balls is preferably 0.5-5 mm. In case where the diameter of the balls is smaller than 0.5 mm, such balls give too low an impact force. In case where the diameter of the balls exceeds 5 mm, the area in which the medium balls come into contact with one another is reduced, resulting in a reduced kneading ability. A more preferred range of the diameter of the balls is 1-3 mm.

The slurry obtained is applied to a negative-electrode current collector and dried. Thereafter, the coated current collector is rolled with a roller press or the like to complete a negative electrode. In this operation, the roll temperature is preferably regulated to 40-180° C. In case where the roll temperature is too low, the conductive material, which has a smaller specific gravity than the negative active material, comes to localize in the electrode surface and a high-density electrode having moderate pores is not obtained. In addition, the resultant electrode has reduced suitability for impregnation with an electrolyte and battery performances also decrease. In case where the roll temperature is higher than 180° C., crystallization of the binder proceeds to reduce electrode flexibility. The resultant layer containing the negative active material is apt to break or peel off. As a result, productivity decreases and battery performances such as output characteristics and charge/discharge cycle characteristics decrease. A more preferred range of the roll temperature is 90-150° C.

2) Nonaqueous Electrolyte

The nonaqueous electrolyte is an electrolyte material which is liquid at ordinary temperature (20° C.) and is prepared by dissolving an electrolyte material in a nonaqueous solvent.

The nonaqueous-electrolyte battery of the embodiment of the invention is characterized in that at least one organic compound having one or more isocyanato groups has been added to the nonaqueous electrolyte.

The organic compound having one or more isocyanato groups to be added may be a cyclic organic compound. However, an organic chain compound is desirable when influences on the environment are taken into account. From the standpoint of dehydration effect, the organic compound having one or more isocyanato groups preferably is, for example, at least one member selected from compounds represented by the following chemical formula (1) or (2).

$$R\text{—}NCO \tag{1}$$

$$NCO\text{—}R\text{—}NCO \tag{2}$$

(R is a chain hydrocarbon having 1-10 carbon atoms.)

Although R is a chain hydrocarbon having 1-10 carbon atoms, one having a low molecular weight can produce a high effect in a small addition amount and is less apt to alter properties of the electrolyte itself, such as electrical conductivity. It is therefore especially desirable that R in the compounds represented by chemical formula (1) or (2) should be a chain hydrocarbon having 1-8 carbon atoms. Of the compounds represented by chemical formula (1) or (2), the compounds represented by chemical formula (2) are especially preferred. This is because the possession of two isocyanato groups doubles the effect of removing water. To select such a compound makes it possible to cope with the case where the amount of water present in the cell has increased.

A desirable example of the organic compound having one or more isocyanato groups is at least one member selected from 1,2-diisocyanatoethane, 1,3-diisocyanato-propane, 1,4-diisocyanatobutane, 1,5-diisocyanatopentane, 1,6-diisocyanatohexane, 1,7-diisocyanatoheptane, and 1,8-diisocyanatooctane. The most preferred compound is 1,6-diisocyanatohexane.

The nonaqueous electrolyte may contain a compound having one or more amino groups which has been generated by the dehydrating reaction of the organic compound having one or more isocyanato groups. In the case where the organic compound having one or more isocyanato groups is a substance represented by chemical formula (1) or (2), the compound having one or more amino groups formed by the reaction of that substance with water is a substance represented by the following chemical formula (3) or (4).

$$R\text{—}NH_2 \tag{3}$$

$$NH_2\text{—}R\text{—}NH_2 \tag{4}$$

(R is a chain hydrocarbon having 1-10 carbon atoms.)

An example of the organic compound having one or more amino groups generated is at least one member selected from 1,2-diaminoethane, 1,3-diaminopropane, 1,4-diamino-butane, 1,5-diaminopentane, 1,6-diaminohexane, 1,7-diaminoheptane, and 1,8-diaminooctane.

In preparing the electrolyte, the organic compound having one or more isocyanato groups is added in an amount of preferably from 0.01% by weight to 10% by weight based on the whole weight of the nonaqueous electrolyte. In case where the amount of the compound added is smaller than 0.01% by weight, the effect of inhibiting gas evolution does not last for long. In case where the amount thereof exceeds 10% by weight, the electrical conductivity of the electrolyte itself decreases, resulting in reduced high-current performance. A more preferred range of the amount thereof is 0.5-5% by weight. Part of the organic compound having one or more isocyanato groups reacts with water to become an organic compound having one or more amino groups. Because of this, the total content of the organic compound having one or more isocyanato groups and the organic compound having one or more amino groups in the battery is also preferably from 0.01% by weight to 10% by weight based on the whole weight of the nonaqueous electrolyte.

The electrolyte material is dissolved in the nonaqueous solvent in a concentration of from 0.5 mol/L to 2.5 mol/L.

Examples of the electrolyte material include lithium salts such as lithium perchlorate ($LiClO_4$), lithium phosphate hexafluoride ($LiPF_6$), lithium borate tetrafluoride ($LiBF_4$), arsenic lithium hexafluoride ($LiAsF_6$), lithium trifluoromethanesulfonate ($LiCF_3SO_3$), and bistrifluoromethyl-sulfonylimidolithium[$LiN(CF_3SO_2)$ 2]. One electrolyte material or two or more electrolyte materials may be used. It is preferred to use one or more electrolyte materials which are less apt to be oxidized even at high potentials. Most preferred is $LiBF_4$ or $LiPF_6$.

Examples of the nonaqueous solvent include cyclic carbonates such as propylene carbonate (PC), ethylene carbonate (EC), and vinylene carbonate, chain carbonates such as diethyl carbonate (DEC), dimethyl carbonate (DMC), and methyl ethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), γ-butyrolactone (GBL), acetonitrile (AN), and sulfolane (SL). Such compounds may be used alone or as a mixture of two or more thereof.

Preferred examples of the nonaqueous solvent include mixed solvents obtained by mixing two or more members selected from the group consisting of propylene carbonate (PC), ethylene carbonate (EC), and γ-butyrolactone (GBL). More preferred examples of the nonaqueous solvent include such mixed solvents including γ-butyrolactone (GBL) as an essential component. The reasons for this are as follows.

First, γ-butyrolactone, propylene carbonate, and ethylene carbonate are high in boiling point and flash point and have excellent thermal stability.

Secondly, γ-butyrolactone is more apt to be reduced than chain carbonates and cyclic carbonates. Upon reduction, γ-butyrolactone in cooperation with a sultone having an unsaturated hydrocarbon group can form a more stable protective coating film. Specifically, the following compounds are more reducible in the following order: γ-butyrolactone>>>ethylene carbonate>propylene carbonate >>dimethyl carbonate>methyl ethyl carbonate>diethyl carbonate. These compounds are more preferable for use as the solvent in the same order. Incidentally, solvents separated by a larger number of >s have a larger difference in reactivity between these.

Consequently, when γ-butyrolactone is incorporated into the electrolyte, the γ-butyrolactone itself slightly decomposes at a potential in a range where the lithium-titanium composite oxide works, whereby a better coating film is formed on the surface of the lithium-titanium oxide. A similar phenomenon occurs in the case of the mixed solvent.

For forming a protective coating film of better quality on the surface of the negative electrode, it is preferred to regulate the content of γ-butyrolactone so as to be from 40% by volume to 95% by volume based on the organic solvent.

Although the nonaqueous electrolyte containing γ-butyrolactone produces the excellent effect described above, it has a high viscosity and shows reduced infiltration into the electrodes. However, when a negative active material having an average particle diameter of 1 μm or smaller is used, even the nonaqueous electrolyte containing γ-butyrolactone can be smoothly infiltrated into the negative electrode. Thus, not only productivity but also output characteristics and charge/discharge cycle characteristics can be improved.

3) Positive Electrode

The positive electrode includes a positive-electrode current collector and a layer containing a positive active material. The layer includes a positive active material, a positive-electrode conductive material, and a binder and has been deposited on one side or each side of the positive-electrode current collector.

Examples of the positive active material include oxides, sulfides, and polymers.

Examples of the oxides include manganese dioxide ($MnO_2$), iron oxide, copper oxide, and nickel oxide which each have inserted lithium, lithium-manganese composite oxides (e.g., $Li_xMn_2O_4$ or $Li_xO_2$), lithium-nickel composite oxides (e.g., $Li_xNiO_2$), lithium-cobalt composite oxides ($Li_xCoO_2$), lithium-nickel-cobalt composite oxides (e.g., $LiNi_{1-y}Co_yO_2$), lithium-manganese-cobalt composite oxides (e.g., $LiMn_yCo_{1-y}O_2$), spinel lithium-manganese-nickel composite oxides ($Li_xMn_{2-y}Ni_yO_4$), lithium-phosphorus oxides having the olivine structure ($Li_xFePO_4$, $Li_xFe_{1-y}Mn_yPO_4$, $Li_xCoPO_4$, etc.), iron sulfate ($Fe_2(SO_4)_3$), vanadium oxides (e.g., $V_2O_5$), and lithium-nickel-cobalt-manganese composite oxides.

Examples of the polymers include conductive polymeric materials such as polyaniline and polypyrrole and disulfide-based polymeric materials. Also usable besides these are sulfur (S), fluorocarbons, and the like.

Examples of positive active materials with which a high positive-electrode voltage is obtained include lithium-manganese composite oxides ($Li_xMn_2O_4$), lithium-nickel composite oxides ($Li_xNiO_2$), lithium-cobalt composite oxides ($Li_xCoO_2$), lithium-nickel-cobalt composite oxides ($Li_xNi_{1-y}Co_yO_2$), spinel lithium-manganese-nickel composite oxides ($Li_xMn_{2-y}Ni_yO_4$), lithium-manganese-cobalt composite oxides ($Li_xMn_yCo_{1-y}O_2$) lithium iron phosphates ($Li_xFePO_4$), and lithium-nickel-cobalt-manganese composite oxides. Incidentally, x and y each preferably is in the range of 0-1.

The lithium-nickel-cobalt-manganese composite oxides preferably have a composition represented by $Li_aNi_bCo_cMn_dO_2$ (provided that the molar proportions a, b, c, and d satisfy $0 \leq a \leq 1.1$, $0.1 \leq b \leq 0.5$, $0 \leq c \leq 0.9$, and $0.1 \leq d \leq 0.5$).

When any of the lithium-transition metal oxides represented by $LiCoO_2$ and $LiMn_2O_4$ is employed as the positive active material in the embodiments of the invention, there are cases where the organic compound having one or more isocyanato groups oxidatively decomposes only slightly to foul the surface of the positive electrode. The influence of this deposition can be lessened by coating part or all of the surface of the lithium-transition metal composite oxide particles with an oxide of at least one element selected from Al, Mg, Zr, B, Ti, and Ga, whereby a nonaqueous-electrolyte battery having a longer life is obtained. Examples of the oxide include $Al_2O_3$, $MgO$, $ZrO_2$, $B_2O_3$, $TiO_2$, and $Ga_2O_3$. The presence of such an oxide is effective in inhibiting the oxidative decomposition of the electrolyte on the surface of the positive active material even when the electrolyte contains the isocyanato compound, whereby battery life prolongation is possible. The oxide of at least one element selected from Al, Mg, Zr, B, Ti, and Ga may be contained in any proportion by mass to the lithium-transition metal composite oxide. However, the amount of that oxide to be contained is preferably 0.1-15% by mass, more preferably 0.3-5% by mass, based on the lithium-transition metal composite oxide. The reasons for this are as follows. In case where the amount of the oxide of at least one element selected from Al, Mg, Zr, B, Ti, and Ga is smaller than 0.1% by mass, the lithium-transition metal composite oxide undergoes substantially no change. In contrast, in case where the oxide of at least one element selected from Al, Mg, Zr, B, Ti, and Ga is contained in an amount exceeding 15% by mass, there is a possibility that the lithium ion battery employing such lithium-transition metal composite oxide as a positive active material might have a reduced capacity.

The lithium-transition metal composite oxide to be used in the embodiments of the invention may include lithium-transition metal composite oxide particles having the oxide of at least one element selected from Al, Mg, Zr, B, Ti, and Ga adherent thereto and lithium-transition metal composite oxide particles having no such oxide adherent thereto.

It is especially desirable that $MgO$, $ZrO_2$, or $B_2O_3$ should be used as the oxide of at least one element selected from Al, Mg, Zr, B, Ti, and Ga. By using the lithium-transition metal composite oxide having that oxide as the positive active material of the lithium ion battery, a charge voltage can be increased to a higher value (e.g., 4.4 V or above) and charge/discharge cycle characteristics can be improved.

The composition of the lithium-transition metal composite oxide may contain other ingredients including unavoidable impurities.

For adhering that oxide to lithium-transition metal composite oxide particles, use may be made of a method in which the particles are impregnated with an aqueous solution containing ions of at least one element selected from Al, Mg, Zr, B, Ti, and Ga and the resultant impregnated lithium-transition metal composite oxide particles are burned to thereby synthesize the target particles. The state of the aqueous solution to be used for the impregnation is not particularly limited so long as the solution can deposit the oxide of at least one element selected from Al, Mg, Zr, B, Ti, and Ga on the surface of the lithium-transition metal composite oxide through burning. An aqueous solution containing Al, Mg, Zr, B, Ti, or Ga in an appropriate form can be used. Examples of the forms of these metals (including boron) include the oxynitrates, nitrates, acetates, sulfates, carbonates, hydroxides, or acids of Al, Mg, Zr, B, Ti, and Ga (=M).

As stated above, $MgO$, $ZrO_2$, or $B_2O_3$ is used in an especially preferred embodiment. Because of this, it is more preferred that the M ions should be Mg ions, Zr ions, or B ions and that the aqueous solution containing M ions to be used should be an aqueous $Mg(NO_3)_2$ solution, aqueous $ZrO(NO_3)_2$ solution, aqueous $ZrCO_4.ZrO_2.8H_2O$ solution, aqueous $Zr(SO_4)_2$ solution, aqueous $H_3BO_3$ solution, or the like. It is most preferred to use an aqueous $Mg(NO_3)_2$ solution, aqueous $ZrO(NO_3)_2$ solution, or aqueous $H_3BO_3$ solution among those. The concentration of the aqueous solution of M ions is not particularly limited. However, a saturated solution is preferred because a reduced solution volume suffices for the impregnation step. In the embodiments of the invention, examples of the form of M ions in the aqueous solution thereof include not only ions of element M alone but also ions made up of element M and other element(s) bonded thereto. In the case of boron, for example, examples of the ions include $B(OH)_4^-$.

In impregnating the lithium-transition metal composite oxide with the aqueous solution of M ions, the ratio by mass between the lithium-transition metal composite oxide and the aqueous solution of M ions is not particularly limited, and may be suitably determined according to the composition of the lithium-transition metal composite oxide to be produced. The period of impregnation is not particularly limited so long as the composite oxide particles are sufficiently impregnated. Impregnation temperature also is not particularly limited.

The lithium-transition metal composite oxide is obtained by burning the impregnated particles. In this step, a burning temperature and a burning period can be determined so as to be within respective ranges preferable for the burning. However, the burning is conducted preferably at 400-800° C. for 1-5 hours, especially preferably at 600° C. for 3 hours. The burning may be conducted in an oxygen stream or in the air. Although the impregnated particles may be burned as they are, it is preferred to dry the particles before the burning in order to remove the water from the mixture. This drying can be conducted by a common technique. For example, heating in an oven, hot-air drying, and the like can be used alone or in combination of two or more thereof. It is preferred that this drying be conducted in an atmosphere of oxygen, air, or the like.

The lithium-transition metal composite oxide thus obtained may be pulverized according to need.

The positive active material has a primary-particle diameter of preferably from 100 nm to 1 μm. When the active material has a primary-particle diameter of 100 nm or larger, this material is easy to handle in industrial production. When the primary-particle diameter thereof is 1 μm or smaller, the diffusion of lithium ions within the solid can proceed smoothly.

The positive active material has a specific surface area of preferably from 0.1 $m^2/g$ to 10 $m^2/g$. When the active material has a specific surface area of 0.1 $m^2/g$ or larger, insertion/release sites for lithium ions are sufficiently secured. When the specific surface area thereof is 10 $m^2/g$ or smaller, this active material is easy to handle in industrial production and satisfactory charge/discharge cycle performance can be secured.

Examples of the positive-electrode conductive material, which functions to enhance current-collecting ability and reduce the resistance of contact with the current collector, include carbonaceous substances such as acetylene black, carbon black, and graphite.

Examples of the binder for binding the positive active material to the positive-electrode conductive material include polytetrafluoroethylene (PTFE), poly(vinylidene fluoride) (PVdF), and fluororubbers.

With respect to the ratio in which the positive active material, positive-electrode conductive material, and binder are mixed together, the proportion of the positive active material is preferably in the range of from 80% by weight to 95% by weight and that of the positive-electrode conductive material is preferably in the range of from 3% by weight to 18% by weight. Furthermore, the proportion of the binder is preferably in the range of from 2% by weight to 17% by weight. With respect to the positive-electrode conductive material, proportions thereof not smaller than 3% by weight enable the conductive material to produce the effects described above, while proportions thereof not larger than 18% by weight are effective in diminishing the decomposition of the nonaqueous electrolyte on the surface of the positive-electrode conductive material during high-temperature storage. With respect to the binder, proportions thereof not smaller than 2% by weight give sufficient electrode strength, while proportions thereof not larger than 17% by weight are effective in reducing the internal resistance of the electrode because of the reduced insulator amount in the electrode.

The positive electrode is produced, for example, by suspending the positive active material, positive-electrode conductive material, and binder in an appropriate solvent to prepare a slurry, applying the slurry to a positive-electrode current collector, drying the coating to form a layer containing the positive active material, and then pressing the resultant structure. Alternatively, the positive active material, positive-electrode conductive material, and binder may be formed into a pellet for use as a layer containing the positive active material.

The positive-electrode current collector preferably is an aluminum foil or an aluminum alloy foil, and has an average crystal grain diameter of preferably 50 μm or smaller like the negative-electrode current collector. The average crystal grain diameter thereof is more preferably 30 μm or smaller, even more preferably 5 μm or smaller. When the aluminum foil or aluminum alloy foil has an average crystal grain diameter of 50 μm or smaller, this foil can have greatly enhanced strength and the positive electrode can be highly densified at a high pressing pressure. Thus, an increase in battery capacity can be attained.

The aluminum foil or aluminum alloy foil having an average crystal grain diameter in the range up to 50 μm is complicatedly influenced by factors including material composition, impurities, processing conditions, heat treatment history, and annealing conditions. The crystal grain diameter is regulated in production steps by combining those factors.

The thickness of the aluminum foil or aluminum alloy foil may be 20 μm or smaller, and is more preferably 15 μm or smaller. The aluminum foil preferably has a purity of 99% or higher. The aluminum alloy preferably is an alloy containing an element such as magnesium, zinc, or silicon. On the other hand, the content of transition metals such as iron, copper, nickel, and chromium is preferably regulated to 1% or lower.

4) Separators

Examples of the separators include porous films including polyethylene, polypropylene, cellulose, or poly(vinylidene fluoride) (PVDF) and nonwoven fabrics made of synthetic resins. Use of separators including cellulose, among these, enables the effects of the embodiments of the invention to be highly produced. This is because the cellulosic separators are apt to take water into the cell since cellulose has terminal hydroxyl groups.

The separators preferably have a median pore diameter as determined by the method of mercury penetration of from 0.15 μm to 2.0 μm. In case where the median pore diameter thereof is smaller than 0.15 μm, such separators have increased film resistance, resulting in a decrease in output. In case where the median pore diameter thereof is larger than 2.0 μm, shutdown by such separators does not occur evenly, resulting in impaired safety. In addition, the diffusion of the electrolyte due to a capillary phenomenon is less apt to occur in such separators, and the resultant deficiency in the electrolyte leads to cycle characteristics deterioration. A more preferred range of the median pore diameter thereof is from 0.18 μm to 0.40 μm.

The separators preferably have a modal pore diameter as determined by the method of mercury penetration of from 0.12 μm to 1.0 μm. In case where the modal pore diameter thereof is smaller than 0.12 μm, such separators have increased film resistance, resulting in a decrease in output. In addition, such separators alter in a high-temperature high-voltage environment to suffer pore collapse, resulting in a decrease in output. In case where the modal pore diameter thereof is larger than 1.0 μm, shutdown by such separators does not occur evenly, resulting in impaired safety. A more preferred range of the modal pore diameter thereof is from 0.18 μm to 0.35 μm.

The separators have a porosity of preferably from 45% to 75%. In case where the porosity thereof is lower than 45%, the absolute amount of ions which can be present in such separators is smaller, resulting in a decrease in output. In case where the porosity thereof exceeds 75%, not only such separators have reduced strength but also shutdown by the separators does not occur evenly, resulting in impaired safety. A more preferred range of the porosity thereof is from 50% to 65%.

5) Case Member

Examples of the case member include laminated films having a thickness of 0.2 mm or smaller and metallic containers having a wall thickness of 1.0 mm or smaller. The wall thickness of the metallic containers is more preferably 0.5 mm or smaller.

Examples of the shape include flat, prismatic, cylindrical, coin, button, sheet, and multilayer shapes. It is a matter of course that the battery of the embodiments of the invention may be a small battery for mounting in portable electronic applications or a large battery for mounting on two- to four-wheeled vehicles, etc.

The laminated films may be multilayered films composed of a metal layer and a resin layer with which the metal layer is coated. From the standpoint of weight reduction, the metal layer preferably is an aluminum foil or aluminum alloy foil. The resin layer is for reinforcing the metal layer. For forming the resin layer, use can be made of a polymer such as polypropylene (PP), polyethylene (PE), nylon, or poly(ethylene terephthalate) (PET). The laminated films are formed by sealing by thermal fusion.

Examples of the material of the metallic containers include aluminum and aluminum alloys. The aluminum alloys preferably are alloys containing an element such as magnesium, zinc, or silicon. On the other hand, the content of transition metals such as iron, copper, nickel, and chromium is preferably regulated to 1% or lower. Use of such a metallic container can greatly improve long-term reliability and heat-dissipating properties in a high-temperature environment.

The metallic can made of aluminum or an aluminum alloy has an average crystal grain diameter of preferably 50 μm or smaller, more preferably 30 μm or smaller, even more preferably 5 μm or smaller. When the average crystal grain diameter thereof is 50 μm or smaller, the metallic can made of aluminum or an aluminum alloy can have greatly enhanced strength and a further reduced wall thickness. As a result, a battery which is lightweight, has a high output and excellent long-term reliability, and is preferable for mounting in vehicles can be realized.

6) Negative-Electrode Terminal

The negative-electrode terminal can be formed from a material which has electrical stability in the potential range of from 0.4 V to 3 V based on lithium ion/metal and further has electrical conductivity. Examples of the material include aluminum alloys containing an element such as Mg, Ti, Zn, Mn, Fe, Cu, or Si, and further include aluminum. From the standpoint of reducing contact resistance, it is preferred to use the same material as the negative-electrode current collector.

7) Positive-Electrode Terminal

The positive-electrode terminal can be formed from a material which has electrical stability in the potential range of from 3 V to 5 V based on lithium ion/metal and further has electrical conductivity. Examples of the material include aluminum alloys containing an element such as Mg, Ti, Zn, Mn, Fe, Cu, or Si, and further include aluminum. From the standpoint of reducing contact resistance, it is preferred to use the same material as the positive-electrode current collector.

Figure 3:
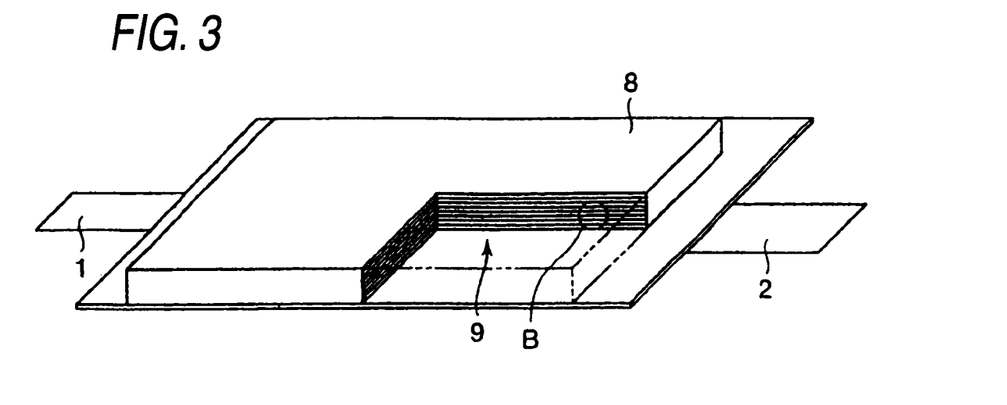
FIG. 3 is a diagrammatic sectional view of a nonaqueous-electrolyte secondary battery according to another embodiment of the invention.
Figure 4A:
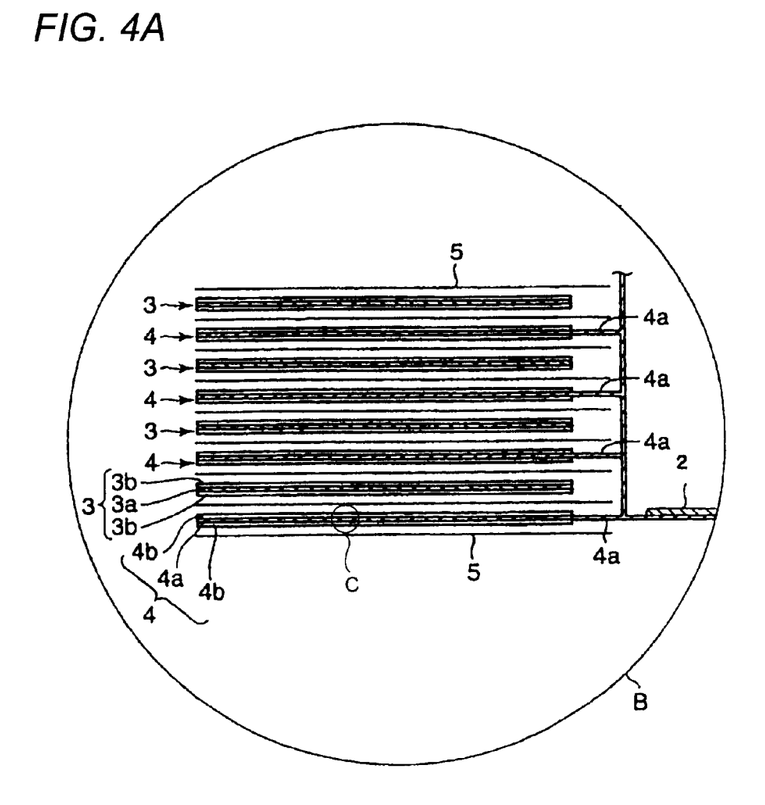
FIG. 4A is a diagrammatic sectional view showing in detail that part in FIG. 3 which is surrounded by the circle B.
Figure 4B:
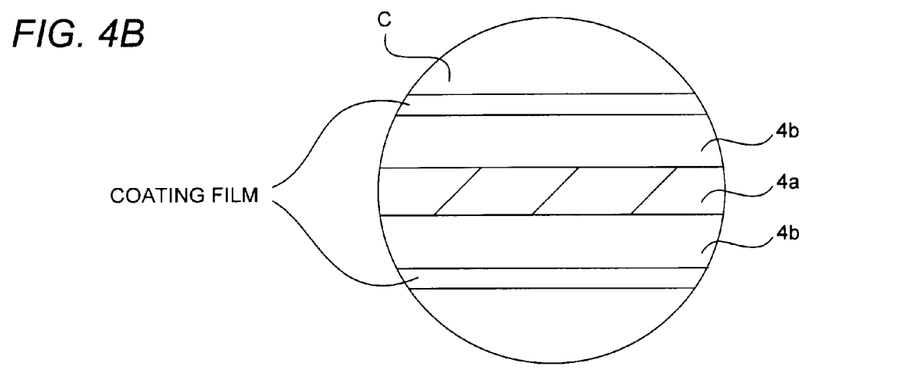
FIG.4B is a diagrammatic sectional view showing in detail that part in FIG. 4A which is surrounded by the circle C.

The constitution of the nonaqueous-electrolyte battery should not be construed as being limited to that shown in FIG. 1 and FIG. 2 described above. For example, the nonaqueous-electrolyte battery can be produced so as to have the constitution shown in FIG. 3 and FIG. 4. FIG. 3 is a partially cutaway slant view diagrammatically illustrating another flat type nonaqueous-electrolyte secondary battery. FIG. 4 is an enlarged sectional view of the part B in FIG. 3.

As shown in FIG. 3, a multilayer type electrode group 9 is held in a case member 8 made of a laminated film. The multilayer type electrode group 9 has a structure formed by alternately stacking a positive electrode 3 and a negative electrode 4 together with a separator 5 interposed between these, as shown in FIG. 4. There are more than one positive electrode 3, and each positive electrode 3 is composed of a positive-electrode current collector 3a and positive-electrode layers 3b containing a positive active material and deposited respectively on both sides of the positive-electrode current collector 3a. There are more than one, negative electrode 4, and each negative electrode 4 is composed of a negative-electrode current collector 4a and layers 4b containing a negative active material and deposited respectively on both sides of the negative-electrode current collector 4a. One edge of the negative-electrode current collector 4a of each negative electrode 4 protrudes from the positive electrodes 3. Those parts of the negative-electrode current collectors 4a which are protrudent from the positive electrodes 3 have been electrically connected to a strip-form negative-electrode terminal 2. An end of the strip-form negative-electrode terminal 2 has been drawn out from the case member 8. Furthermore, that edge of the positive-electrode current collector 3a of each positive electrode 3 which is located on the side opposite to the protrudent edges of the negative-electrode current collectors 4a protrudes from the negative electrodes 4, although this is not shown in the figure. Those parts of the positive-electrode current collectors 3a which are protrudent from the negative electrodes 4 have been electrically connected to a strip-form positive-electrode terminal 1. An end of the strip-form positive-electrode terminal 1 is located on the side opposite to the negative-electrode terminal 2 and has been drawn out from an edge of the case member 8.

One example of the battery cell according to a first embodiment was explained above by reference to FIG. 1 and FIG. 2, in which the electrode group including a positive electrode and a negative electrode was a group of wound electrodes. However, the structure of the electrode group may be changed to a multilayer structure.

A battery pack obtained by connecting battery cells in an electrically serial or parallel arrangement to fabricate a battery assembly and combining this battery assembly with a battery control circuit, etc. is explained below as an example by reference to FIG. 5 and FIG. 6.

This battery pack as an embodiment includes nonaqueous-electrolyte batteries (cells) each having the constitution described above, and the cells have been connected in an electrically serial or parallel arrangement.

This battery pack is explained in detail by reference to FIG. 5 and FIG. 6. As the cells can be used, for example, flat type batteries each having the constitution shown in FIG. 1 and FIG. 2.

The cells 21 constituted of such flat type nonaqueous-electrolyte batteries have been stacked so that the negative-electrode terminals 2 and the positive-electrode terminals 1 project outward in the same direction, and bound with a pressure-sensitive adhesive tape 22 to thereby constitute a battery assembly 23. These cells 21 have been electrically serially connected as shown in FIG. 6.

A printed wiring board 24 has been disposed so as to face that side of the cells 21 on which the negative-electrode terminals 2 and positive-electrode terminals 1 project. As shown in FIG. 6, a thermistor 25, a protective circuit 26, and a terminal 27 for electrical connection to external apparatus have been mounted on the printed wiring board 24. That side of the printed wiring board 24 which faces the battery assembly 23 has an insulating sheet (not shown) for avoiding unnecessary connection to the wiring of the battery assembly 23.

A positive-electrode lead 28 has been connected to the positive-electrode terminal 1 located at the lowermost layer of the battery assembly 23, and the end thereof has been inserted in and electrically connected to a positive-electrode connector 29 of the printed wiring board 24. A negative-electrode lead 30 has been connected to the negative-electrode terminal 2 located at the uppermost layer of the battery assembly 23, and the end thereof has been inserted in and electrically connected to a negative-electrode connector 31 of the printed wiring board 24. These connectors 29 and 31 have been connected to the protective circuit 26 via wirings 32 and 33 formed on the printed wiring board 24.

The thermistor 25 measures the temperature of the cells 21, and the measurement signals are sent to the protective circuit 26. The protective circuit 26 can break, under given conditions, a plus-side wiring 34a and a minus-side wiring 34b both disposed between the protective circuit 26 and the terminal 27 for connection to external apparatus. The given conditions include, for example, ones in which the temperature measured by the thermistor 25 has reached a given temperature or higher. The given conditions further include ones in which the overcharge, overdischarge, overcurrent, or the like of the cells 21 has been detected. This detection of overcharge, etc. is made for each cell 21 or for the cells 21 as a whole. In the case where overcharge, etc. is detected with respect to each cell 21, the cell voltage may be measured or the positive-electrode potential or negative-electrode potential may be measured. In the latter case, a lithium electrode for use as a reference electrode is inserted into each cell 21. In the case illustrated in FIG. 5 and FIG. 6, a wiring 35 for voltage measurement is connected to each of the cells 21, and measurement signals are sent to the protective circuit 26 through these wirings 35.

Those three sides of the battery assembly 23 which exclude the side where the positive-electrode terminals 1 and the negative-electrode terminals 2 protrude each have a protective sheet 36 disposed thereon which is made of a rubber or resin.

The battery assembly 23 is packed into a container 37 together with the protective sheets 36 and the printed wiring board 24. Namely, the protective sheets 36 are disposed respectively on the two length-direction inner faces and one width-direction inner face of the container 37, and the printed wiring board 24 is disposed on the width-direction inner face on the opposite side. The battery assembly 23 is positioned in the space surrounded by the protective sheets 36 and the printed wiring board 24. A lid 38 has been attached to the top of the container 37.

Incidentally, a heat-shrinkable tube may be used in place of the pressure-sensitive adhesive tape 22 for fixing the battery assembly 23. In this case, cells stacked are bound by disposing protective sheets respectively on both sides of the stacked cells, lapping the heat-shrinkable tube therearound, and thermally shrinking the heat-shrinkable tube.

Figure 5:
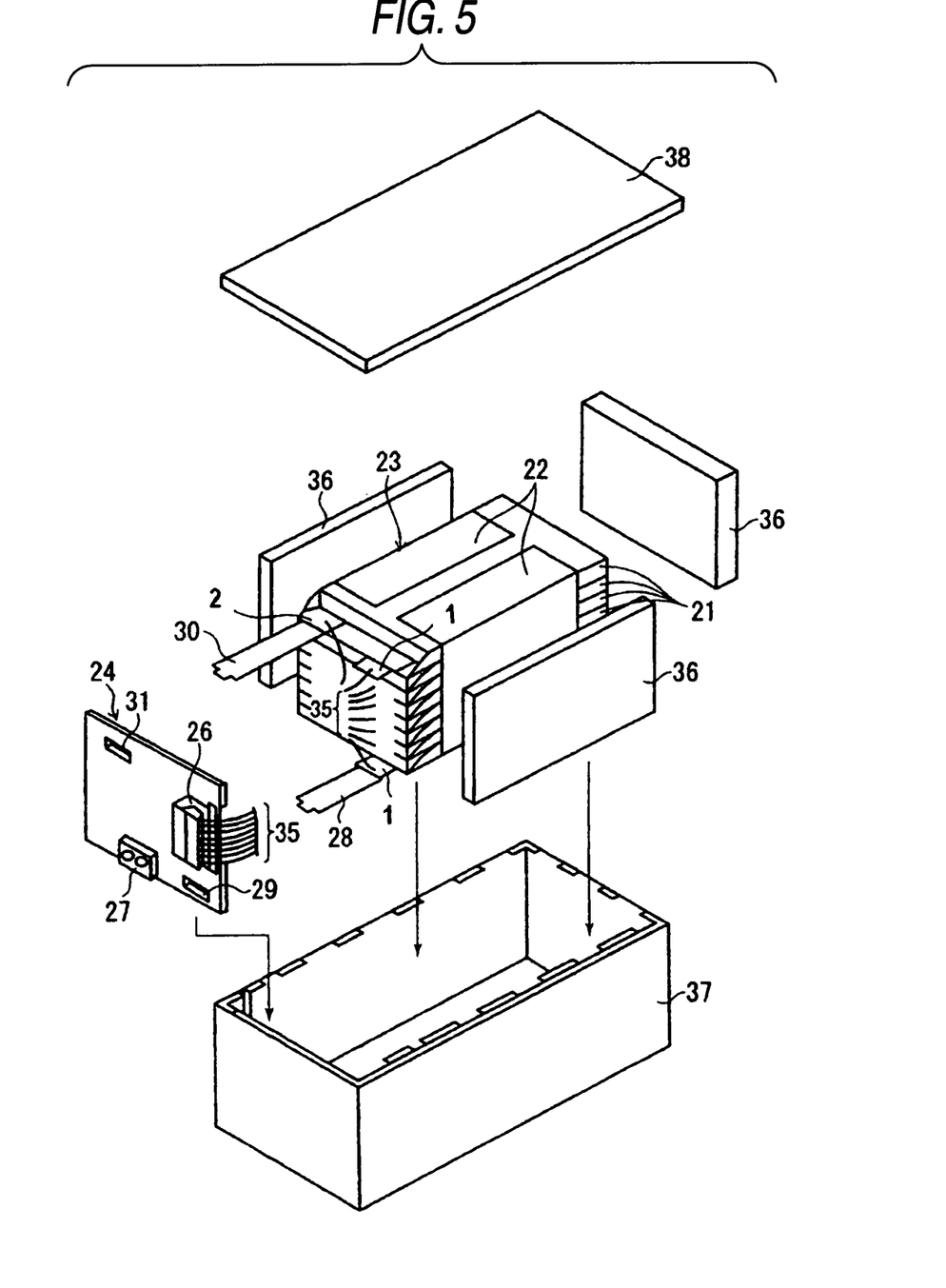
FIG. 5 is an exploded slant view of a battery pack.
Figure 6:
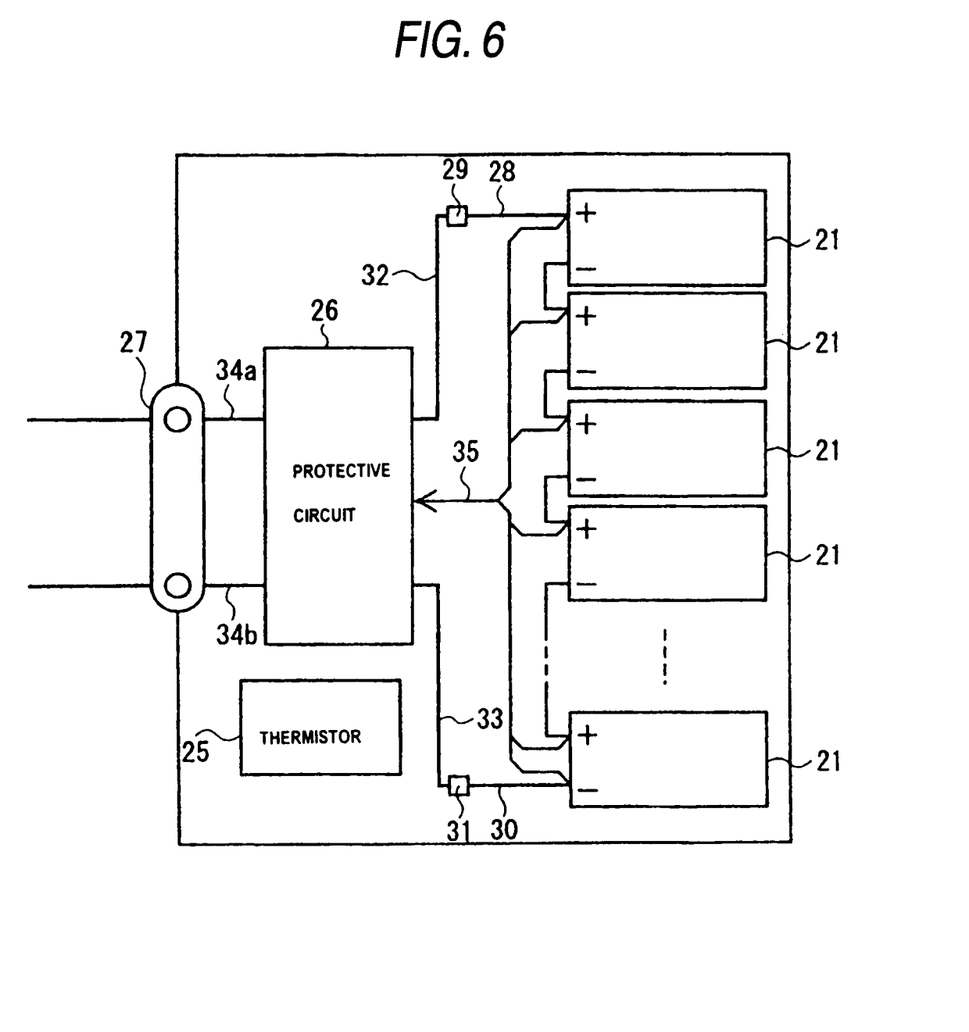
FIG. 6 is a block diagram showing an electrical circuit of the battery pack.

Although the embodiment shown in FIG. 5 and FIG. 6 is one in which cells 21 are serially connected, the cells may be connected in parallel in order to increase battery capacity. It is also possible to connect assembled battery packs serially or in parallel.

The embodiment of the battery pack is suitably modified according to applications. Preferred applications of the battery pack are ones in which suitability for cycling at a high current is desired. Specific examples thereof include use as a power source for digital cameras and mounting on vehicles such as two- to four-wheeled hybrid electric cars, two- to four-wheeled electric cars, and power-assisted bicycles. The battery pack is preferable for mounting on vehicles.

As stated above, a nonaqueous-electrolyte battery having excellent high-temperature characteristics can be obtained by using a nonaqueous electrolyte containing a mixed solvent prepared by mixing at least two members selected from propylene carbonate (PC), ethylene carbonate (EC), and γ-butyrolactone (GBL) or containing γ-butyrolactone (GBL). A battery pack having a battery assembly including such nonaqueous-electrolyte batteries is preferable for mounting on vehicles.

The invention will be explained below by reference to Examples. However, various changes can be made therein without departing from the spirit of the invention. The invention should not be construed as being limited to the following Examples.

EXAMPLE 1

<Production of Positive Electrode>

To N-methylpyrrolidone (NMP) were added 90% by weight lithium-manganese oxide ($LiMn_2O_4$) powder as a positive active material, 3% by weight acetylene black and 3% by weight graphite as conductive materials, and 4% by weight poly(vinylidene fluoride) (PVdF). The ingredients were mixed together to obtain a slurry. This slurry was applied to each side of a current collector which was an aluminum foil having a thickness of 15 μm. The slurry applied was dried, and the coated foil was pressed to thereby produce a positive electrode having an electrode density of 3.0 g/cm$^3$.

<Production of Negative Electrode>

A spinel lithium titanate ($Li_4Ti_5O_{12}$) powder having an average particle diameter of 0.84 μm, BET specific surface area of 10.8 m$^2$/g, and lithium insertion potential of 1.55 V (vs. Li/Li$^+$) was prepared as a negative active material. The particle diameter of this negative active material was determined with a laser diffraction type distribution analyzer (SALD-300, manufactured by Shimadzu Corp.) by the following method. First, about 0.1 g of a sample was introduced into a beaker together with a surfactant and 1-2 mL of distilled water. The contents were sufficiently stirred, subsequently poured into a water tank being stirred, and examined for intensity distribution of the laser beam 64 times at intervals of 2 seconds. The particle size distribution data were analyzed to determine the average particle diameter.

N-Methylpyrrolidone (NMP) was added to 90% by weight the negative active material, 5% by weight coke burned at 1,300° C. (having a $d_{002}$ of 0.3465 nm, average particle diameter of 8.2 μm, and BET specific surface area of 11.2 m$^2$/g) as a conductive material, and 5% by weight poly(vinylidene fluoride) (PVDF) in such an amount as to result in a solid proportion of 62%. This mixture was kneaded with a planetary mixer, and the solid proportion was gradually lowered by adding NMP to prepare a slurry having a viscosity of 10.2 cP (value measured with a Brookfield viscometer at 50 rpm). This slurry was further mixed by means of a bead mill using zirconia beads having a diameter of 1 mm as a medium.

The slurry obtained was applied to each side of a current collector which was an aluminum foil having a thickness of 15 μm (purity, 99.3%; average crystal grain diameter, 10 μm). The slurry applied was dried, and the coated foil was pressed with rolls heated at 100° C. to thereby obtain a negative electrode.

<Production of Electrode Group>

The positive electrode, a separator constituted of a porous polyethylene film having a thickness of 25 μm, the negative electrode, and a separator constituted of the same film were superposed in this order and then spirally wound. The resultant roll was pressed with heating at 80° C. to thereby produce a flat electrode group having a height of 50 mm, width of 33 mm, and thickness of 1.8 mm. The electrode group obtained was packed into a pack made of a laminated film having a three-layer structure composed of nylon layer/aluminum layer/polyethylene layer and having a thickness of 0.1 mm. The electrode group in the pack was vacuum-dried at 80° C. for 24 hours.

<Preparation of Liquid Nonaqueous Electrolyte>

In a mixed solvent composed of ethylene carbonate (EC) and γ-butyrolactone (GBL) (volume ratio, 1:2) was dissolved $LiBF_4$ as an electrolyte material in a concentration of 2.0 mol/L. Furthermore, 1,6-diisocyanatohexane was added to the solution in an amount of 0.01% by weight based on the whole nonaqueous electrolyte amount. Thus, a nonaqueous electrolyte was prepared. This nonaqueous electrolyte had a viscosity at 20° C. of 7.1 cP (measured with a Brookfield viscometer).

The liquid nonaqueous electrolyte was injected into the laminated-film pack into which the electrode group had been packed. Thereafter, this pack was completely closed by heat sealing to produce a nonaqueous-electrolyte secondary battery having the structure shown in FIG. 1 and having a width of 35 mm, thickness of 2.0 mm, and height of 65 mm.

COMPARATIVE EXAMPLE 1 AND EXAMPLES 1 TO 4 AND 7 TO 12

Nonaqueous-electrolyte secondary batteries were produced in the same manner as in Example 1, except that the amount of the 1,6-diisocyanatohexane to be added in preparing the nonaqueous electrolyte was changed to the amounts shown in Table 1.

EXAMPLES 5 AND 13

Nonaqueous-electrolyte secondary batteries were produced in the same manners as in Examples 4 and 10, except that 1,4-diisocyanatobutane was added in place of the 1,6-diisocyanatohexane in preparing the nonaqueous electrolytes.

EXAMPLES 14 TO 18

Nonaqueous-electrolyte secondary batteries were produced in the same manner as in Example 10, except that 1-isocyanatoethane, 2-isocyanatopropane, 1-isocyanatohexane, 1-isocyanatobutane, or 3-isocyanato-1-propene was added in place of the 1,6-diisocyanatohexane in preparing the nonaqueous electrolyte.

EXAMPLES 6 AND 19

Nonaqueous-electrolyte secondary batteries were produced in the same manners as in Examples 4 and 10, except that 2,4-diisocyanatotoluene was added in place of the 1,6-diisocyanatohexane in preparing the nonaqueous electrolytes.

EXAMPLE 20

A nonaqueous-electrolyte secondary battery was produced in the same manner as in Example 9, except that the solvent and solute used in preparing the nonaqueous electrolyte were changed to a mixed solvent composed of ethylene carbonate (EC) and dimethyl carbonate (DMC) (volume ratio, 1:2) and 1.5-M $LiPF_6$, respectively.

EXAMPLE 21

A nonaqueous-electrolyte secondary battery was produced in the same manner as in Example 9, except that the solvent and solute used in preparing the nonaqueous electrolyte were changed to a mixed solvent composed of ethylene carbonate (EC) and diethyl carbonate (DEC) (volume ratio, 1:2) and 1.5-M $LiPF_6$, respectively.

EXAMPLE 22

A nonaqueous-electrolyte secondary battery was produced in the same manner as in Example 9, except that the solvent and solute used in preparing the nonaqueous electrolyte were changed to a mixed solvent composed of ethylene carbonate (EC) and ethyl methyl carbonate (EMC) (volume ratio, 1:2) and 1.5-M $LiPF_6$, respectively.

EXAMPLE 23

A nonaqueous-electrolyte secondary battery was produced in the same manner as in Example 9, except that as a positive active material, use was made of $LiMn_2O_4$ coated with $ZrO_2$ in an amount of 1% by weight based on the positive active material.

EXAMPLE 24

A nonaqueous-electrolyte secondary battery was produced in the same manner as in Example 9, except that as a positive active material, use was made of $LiMn_2O_4$ coated with MgO in an amount of 0.3% by weight based on the positive active material.

EXAMPLE 25

A nonaqueous-electrolyte secondary battery was produced in the same manner as in Example 9, except that as a positive active material, use was made of $LiMn_2O_4$ coated with $B_2O_3$ in an amount of 1% by weight based on the positive active material.

EXAMPLE 26

A nonaqueous-electrolyte secondary battery was produced in the same manner as in Example 9, except that as a positive active material, use was made of $LiMn_2O_4$ coated with $Al_2O_3$ in an amount of 1% by weight based on the positive active material.

COMPARATIVE EXAMPLE 2 AND EXAMPLE 27

Nonaqueous-electrolyte secondary batteries were produced in the same manners as in Comparative Example 1 and Example 11, except that $TiO_2$ was used as a negative active material.

COMPARATIVE EXAMPLES 3 AND 4

Nonaqueous-electrolyte secondary batteries were produced in the same manners as in Comparative Example 1 and Example 11, except that graphite having an average particle diameter of 6 μm was used as a negative active material.

COMPARATIVE EXAMPLE 5 AND EXAMPLES 28 TO 30

Nonaqueous-electrolyte secondary batteries were produced in the same manners as in Comparative Example 1 and Examples 9 to 11, except that $LiCoO_2$ was used as a positive active material.

COMPARATIVE EXAMPLE 6 AND EXAMPLES 31 TO 33

Nonaqueous-electrolyte secondary batteries were produced in the same manners as in Comparative Example 1 and Examples 9 to 11, except that $LiFePO_4$ was used as a positive active material.

The batteries of Examples 1 to 33 and Comparative Examples 1 to 6 were subjected to low-rate discharge at 1 C and high-rate discharge at 10 C. The ratios of 10-C capacity to 1-C capacity are shown in Table 1 and Table 2. Furthermore, each battery in a 50% charged state (SOC 50%) was stored in a 60° C. environment for 1 month and then examined for change in battery thickness through the storage. The percentage increases in battery thickness {=[(battery thickness after storage)-(battery thickness before storage)]/(battery thickness before storage)×100} are also shown in Table 1 and Table 2. Moreover, the batteries which had undergone the storage were discharged, and the percentage residual capacities {=(capacity after storage)/(capacity before storage)×100} are also shown in Table 1 and Table 2.

The batteries of the Examples, in which an organic compound having one or more isocyanato groups had been added to the nonaqueous electrolyte, were high in the ratio of 10-C capacity to 1-C capacity. It can hence be seen that these batteries had excellent high-current characteristics and had not deteriorated in internal resistance. Furthermore, the batteries of the Examples were low in the percentage increase in battery thickness through 60° C. storage, showing that gas evolution within the batteries was inhibited. In addition, the batteries of the Examples had a high percentage residual capacity, indicating that these batteries were inhibited from suffering self-discharge.

TABLE 1

| | Negative active material | Positive active material | Solvent | Solute | Isocyanato compound added | Amount (wt %) | Detection ingredient I in electrolyte | Detection ingredient II in electrolyte | 10C/1C capacity ratio (%) | Percentage increase in battery thickness (%) | Percentage residual capacity (%) |
|---|---|---|---|---|---|---|---|---|---|---|---|
| Comp. Ex. 1 | $Li_4Ti_5O_{12}$ | $LiMn_2O_4$ | EC/GBL (1:2) | 2.0M $LiBF_4$ | — | — | — | — | 35 | ≥200 | 38 |
| Ex. 1 | $Li_4Ti_5O_{12}$ | $LiMn_2O_4$ | EC/GBL (1:2) | 2.0M $LiBF_4$ | 1,6-diiso-cyanato-hexane | 0.01 | — | 1,6-di-amino-hexane | 58 | 30 | 41 |
| Ex. 2 | $Li_4Ti_5O_{12}$ | $LiMn_2O_4$ | EC/GBL (1:2) | 2.0M $LiBF_4$ | 1,6-diiso-cyanato-hexane | 0.03 | — | 1,6-di-amino-hexane | 62 | 20 | 44 |
| Ex. 3 | $Li_4Ti_5O_{12}$ | $LiMn_2O_4$ | EC/GBL (1:2) | 2.0M $LiBF_4$ | 1,6-diiso-cyanato-hexane | 0.05 | — | 1,6-di-amino-hexane | 68 | 15 | 52 |
| Ex. 4 | $Li_4Ti_5O_{12}$ | $LiMn_2O_4$ | EC/GBL (1:2) | 2.0M $LiBF_4$ | 1,6-diiso-cyanato-hexane | 0.1 | — | 1,6-di-amino-hexane | 72 | 10 | 48 |
| Ex. 5 | $Li_4Ti_5O_{12}$ | $LiMn_2O_4$ | EC/GBL (1:2) | 2.0M $LiBF_4$ | 1,4-diiso-cyanato-butane | 0.1 | — | 1,4-di-amino-butane | 64 | 20 | 44 |
| Ex. 6 | $Li_4Ti_5O_{12}$ | $LiMn_2O_4$ | EC/GBL (1:2) | 2.0M $LiBF_4$ | 2,4-diiso-cyanato-toluene | 0.1 | — | 2,4-di-amino-toluene | 56 | 30 | 46 |
| Ex. 7 | $Li_4Ti_5O_{12}$ | $LiMn_2O_4$ | EC/GBL (1:2) | 2.0M $LiBF_4$ | 1,6-diiso-cyanato-hexane | 0.2 | 1,6-diiso-cyanato-hexane | 1,6-di-amino-hexane | 82 | 10 | 62 |
| Ex. 8 | $Li_4Ti_5O_{12}$ | $LiMn_2O_4$ | EC/GBL (1:2) | 2.0M $LiBF_4$ | 1,6-diiso-cyanato-hexane | 0.5 | 1,6-diiso-cyanato-hexane | 1,6-di-amino-hexane | 84 | 8 | 65 |
| Ex. 9 | $Li_4Ti_5O_{12}$ | $LiMn_2O_4$ | EC/GBL (1:2) | 2.0M $LiBF_4$ | 1,6-diiso-cyanato-hexane | 1 | 1,6-diiso-cyanato-hexane | 1,6-di-amino-hexane | 90 | 6 | 72 |
| Ex. 10 | $Li_4Ti_5O_{12}$ | $LiMn_2O_4$ | EC/GBL (1:2) | 2.0M $LiBF_4$ | 1,6-diiso-cyanato-hexane | 2 | 1,6-diiso-cyanato-hexane | 1,6-di-amino-hexane | 88 | <2 | 78 |
| Ex. 11 | $Li_4Ti_5O_{12}$ | $LiMn_2O_4$ | EC/GBL (1:2) | 2.0M $LiBF_4$ | 1,6-diiso-cyanato-hexane | 5 | 1,6-diiso-cyanato-hexane | 1,6-di-amino-hexane | 80 | <2 | 78 |
| Ex. 12 | $Li_4Ti_5O_{12}$ | $LiMn_2O_4$ | EC/GBL (1:2) | 2.0M $LiBF_4$ | 1,6-diiso-cyanato-hexane | 10 | 1,6-diiso-cyanato-hexane | 1,6-di-amino-hexane | 66 | <2 | 62 |
| Ex. 13 | $Li_4Ti_5O_{12}$ | $LiMn_2O_4$ | EC/GBL (1:2) | 2.0M $LiBF_4$ | 1,4-diiso-cyanato-butane | 2 | 1,4-diiso-cyanato-butane | 1,4-di-amino-butane | 84 | 6 | 70 |
| Ex. 14 | $Li_4Ti_5O_{12}$ | $LiMn_2O_4$ | EC/GBL (1:2) | 2.0M $LiBF_4$ | 1-iso-cyanato-ethane | 2 | 1-iso-cyanato-ethane | 1-amino-ethane | 80 | 8 | 62 |
| Ex. 15 | $Li_4Ti_5O_{12}$ | $LiMn_2O_4$ | EC/GBL (1:2) | 2.0M $LiBF_4$ | 2-iso-cyanato propane | 2 | 2-iso-cyanato propane | 2-amino-propane | 78 | 8 | 60 |
| Ex. 16 | $Li_4Ti_5O_{12}$ | $LiMn_2O_4$ | EC/GBL (1:2) | 2.0M $LiBF_4$ | 1-iso-cyanato-hexane | 2 | 1-iso-cyanato-hexane | 1-amino-hexane | 84 | 6 | 66 |
| Ex. 17 | $Li_4Ti_5O_{12}$ | $LiMn_2O_4$ | EC/GBL (1:2) | 2.0M $LiBF_4$ | 1-iso-cyanato-butane | 2 | 1-iso-cyanato-butane | 1-amino-butane | 80 | 8 | 62 |
| Ex. 18 | $Li_4Ti_5O_{12}$ | $LiMn_2O_4$ | EC/GBL (1:2) | 2.0M $LiBF_4$ | 3-iso-cyanato-1-propene | 2 | 3-iso-cyanato-1-propene | 3-amino-1-propene | 78 | 10 | 60 |
| Ex. 19 | $Li_4Ti_5O_{12}$ | $LiMn_2O_4$ | EC/GBL (1:2) | 2.0M $LiBF_4$ | 2,4-diiso-cyanato-toluene | 2 | 2,4-diiso-cyanato-toluene | 2,4-di-amino-toluene | 75 | 18 | 62 |

TABLE 2

| | Negative active material | Positive active material | Solvent | Solute | Isocyanato compound added | Amount (wt %) | Detection ingredient I in electrolyte | Detection ingredient II in electrolyte | 10C/1C capacity ratio (%) | Percentage increase in battery thickness (%) | Percentage residual capacity (%) |
|---|---|---|---|---|---|---|---|---|---|---|---|
| Ex. 20 | $Li_4Ti_5O_{12}$ | $LiMn_2O_4$ | EC/DMC (1:2) | 1.5M $LiPF_6$ | 1,6-diiso-cyanato-hexane | 1 | 1,6-diiso-cyanato-hexane | 1,6-di-amino-hexane | 80 | 15 | 60 |

TABLE 2-continued

| | Negative active material | Positive active material | Solvent | Solute | Isocyanato compound added | Amount (wt %) | Detection ingredient I in electrolyte | Detection ingredient II in electrolyte | 10C/1C capacity ratio (%) | Percentage increase in battery thickness (%) | Percentage residual capacity (%) |
|---|---|---|---|---|---|---|---|---|---|---|---|
| Ex. 21 | $Li_4Ti_5O_{12}$ | $LiMn_2O_4$ | EC/DEC (1:2) | 1.5M $LiPF_6$ | 1,6-diiso-cyanato-hexane | 1 | 1,6-diiso-cyanato-hexane | 1,6-di-amino-hexane | 80 | 15 | 67 |
| Ex. 22 | $Li_4Ti_5O_{12}$ | $LiMn_2O_4$ | EC/EMC (1:2) | 1.5M $LiPF_6$ | 1,6-diiso-cyanato-hexane | 1 | 1,6-diiso-cyanato-hexane | 1,6-di-amino-hexane | 80 | 15 | 64 |
| Ex. 23 | $Li_4Ti_5O_{12}$ | $LiMn_2O_4$—($ZrO_2$) | EC/GBL (1:2) | 2.0M $LiBF_4$ | 1,6-diiso-cyanato-hexane | 1 | 1,6-diiso-cyanato-hexane | 1,6-di-amino-hexane | 90 | <2 | 75 |
| Ex. 24 | $Li_4Ti_5O_{12}$ | $LiMn_2O_4$—(MgO) | EC/GBL (1:2) | 2.0M $LiBF_4$ | 1,6-diiso-cyanato-hexane | 1 | 1,6-diiso-cyanato-hexane | 1,6-di-amino-hexane | 90 | <2 | 75 |
| Ex. 25 | $Li_4Ti_5O_{12}$ | $LiMn_2O_4$—($B_2O_3$) | EC/GBL (1:2) | 2.0M $LiBF_4$ | 1,6-diiso-cyanato-hexane | 1 | 1,6-diiso-cyanato-hexane | 1,6-di-amino-hexane | 88 | <2 | 73 |
| Ex. 26 | $Li_4Ti_5O_{12}$ | $LiMn_2O_4$—($Al_2O_3$) | EC/GBL (1:2) | 2.0M $LiBF_4$ | 1,6-diiso-cyanato-hexane | 1 | 1,6-diiso-cyanato-hexane | 1,6-di-amino-hexane | 90 | <2 | 74 |
| Comp. Ex. 2 | $TiO_2$ | $LiMn_2O_4$ | EC/GBL (1:2) | 2.0M $LiBF_4$ | — | — | — | — | 30 | ≥200 | 30 |
| Ex. 27 | $TiO_2$ | $LiMn_2O_4$ | EC/GBL (1:2) | 2.0M $LiBF_4$ | 1,6-diiso-cyanato-hexane | 2 | 1,6-diiso-cyanato-hexane | 1,6-di-amino-hexane | 70 | <2 | 58 |
| Comp. Ex. 3 | graphite | $LiMn_2O_4$ | EC/GBL (1:2) | 2.0M $LiBF_4$ | — | — | — | — | 52 | 20 | 70 |
| Comp. Ex. 4 | graphite | $LiMn_2O_4$ | EC/GBL (1:2) | 2.0M $LiBF_4$ | 1,6-diiso-cyanato-hexane | 2 | — | — | 10 | ≥100 | 20 |
| Comp. Ex. 5 | $Li_4Ti_5O_{12}$ | $LiCoO_2$ | EC/GBL (1:2) | 2.0M $LiBF_4$ | — | — | — | — | 70 | 30 | 40 |
| Ex. 28 | $Li_4Ti_5O_{12}$ | $LiCoO_2$ | EC/GBL (1:2) | 2.0M $LiBF_4$ | 1,6-diiso-cyanato-hexane | 1 | 1,6-diiso-cyanato-hexane | 1,6-di-amino-hexane | 92 | <2 | 70 |
| Ex. 29 | $Li_4Ti_5O_{12}$ | $LiCoO_2$ | EC/GBL (1:2) | 2.0M $LiBF_4$ | 1,6-diiso-cyanato-hexane | 2 | 1,6-diiso-cyanato-hexane | 1,6-di-amino-hexane | 90 | <2 | 74 |
| Ex. 30 | $Li_4Ti_5O_{12}$ | $LiCoO_2$ | EC/GBL (1:2) | 2.0M $LiBF_4$ | 1,6-diiso-cyanato-hexane | 5 | 1,6-diiso-cyanato-hexane | 1,6-di-amino-hexane | 80 | <2 | 74 |
| Comp. Ex. 6 | $Li_4Ti_5O_{12}$ | $LiFePO_4$ | EC/GBL (1:2) | 2.0M $LiBF_4$ | — | — | — | — | 45 | ≥100 | 40 |
| Ex. 31 | $Li_4Ti_5O_{12}$ | $LiFePO_4$ | EC/GBL (1:2) | 2.0M $LiBF_4$ | 1,6-diiso-cyanato-hexane | 1 | 1,6-diiso-cyanato-hexane | 1,6-di-amino-hexane | 88 | 6 | 68 |
| Ex. 32 | $Li_4Ti_5O_{12}$ | $LiFePO_4$ | EC/GBL (1:2) | 2.0M $LiBF_4$ | 1,6-diiso-cyanato-hexane | 2 | 1,6-diiso-cyanato-hexane | 1,6-di-amino-hexane | 85 | <2 | 72 |
| Ex. 33 | $Li_4Ti_5O_{12}$ | $LiFePO_4$ | EC/GBL (1:2) | 2.0M $LiBF_4$ | 1,6-diiso-cyanato-hexane | 5 | 1,6-diiso-cyanato-hexane | 1,6-di-amino-hexane | 77 | <2 | 72 |

The electrolyte and negative electrode of each battery which had undergone the one-month storage and residual capacity measurement under the conditions described above were examined for the presence of the isocyanato-possessing compound and amino-possessing compound in the electrolyte and on the negative-electrode surface by gas chromatography/mass spectrometry (GC/MS) and with a Fourier-transform infrared spectrophotometer (FT-IR). The results obtained are also shown in Table 1 and Table 2. In Tables 1 and 2, the results of detection of the isocyanato-possessing compound are given under Detection ingredient I, while the results of detection of the amino-possessing compound are given under Detection ingredient II.

In the batteries of Examples in which an organic compound having one or more isocyanato groups had been added in a small amount (Examples 1 to 6), no isocyanato compound was detected. It is thought that the organic isocyanato compound in each battery had been consumed. In each of the batteries of these Examples, an amino-possessing compound was detected. It was thus found that the isocyanato-possessing compound added had become the amino-possessing compound.

It can be further seen that the batteries in which the solvent included γ-butyrolactone were low in percentage increase in battery thickness, high in percentage residual capacity, and reduced in self-discharge. It can be furthermore seen that the coating of the surface of a positive active material with an oxide was effective in further reducing the percentage increase in battery thickness. It is presumed that the electrolyte was inhibited from being oxidatively decomposed and thus generating a gas and this inhibition brought about those results. In addition, it can be seen that the effect of the addition of an isocyanato compound was obtained even when the positive active material was not a manganese compound.

In contrast, in the case of Comparative Example 4, in which graphite was used as the negative active material, the addition of an isocyanato compound reduced high-current performance, increased the percentage increase in battery thickness, and resulted in considerable self-discharge. This is apparent from a comparison between Comparative Example 4 and Comparative Example 3. It is presumed that the isocyanato compound added was completely reduced on the surface of the negative electrode to induce gas evolution and the resultant reduction product excessively deposited on the negative-electrode surface to reduce the battery performances.

Incidentally, with respect to expressions of the molar proportion of oxygen in negative-electrode materials in the Examples and the Tables, the oxygen proportion in spinel $Li_4Ti_5O_{12}$ was formally expressed as 12. However, such values can change due to the influence of oxygen non-stoichiometry, etc.

Although embodiments of the invention were explained above, the invention should not be construed as being limited thereto and various modifications thereof are possible within the scope of the invention described in the claims. In practicing the invention, various modifications of the invention are possible without departing from the spirit of the invention. Furthermore, by suitably combining two or more of constituent elements disclosed in the embodiments, various inventions can be achieved.

What is claimed is:

1. A nonaqueous-electrolyte battery comprising:
a case,
a positive electrode held in the case,
a negative electrode held in the case and including a negative active material having a lithium insertion/release potential higher than 1.0 V (vs. Li/Li$^+$),
a coating film on the surface of the negative electrode, and
a nonaqueous electrolyte packed in the case, wherein the nonaqueous electrolyte is liquid at room temperature and comprises a nonaqueous solvent, an electrolyte material, and at least one organic compound having one or more isocyanato groups,
wherein the coating film is formed upon addition of the at least one organic compound having one or more isocyanato groups to the nonaqueous electrolyte, and wherein a part of an amino compound having at least one amino group formed during the addition is included in the coating film on the surface of the negative electrode.

2. The battery of claim 1, wherein the amino compound having at least one amino group is formed by a reaction of the isocyanato groups with water upon the addition of the at least one organic compound having one or more isocyanato groups to the nonaqueous electrolyte.

3. The battery of claim 1, wherein the at least one organic compound having one or more isocyanato groups is an organic chain compound.

4. The battery of claim 1, wherein the at least one organic compound having one or more isocyanato groups is at least one member selected from the group consisting of a compound represented by the chemical formula (1), a compound represented by the chemical formula (2), and a mixture thereof:

R—NCO (1)

NCO—R—NCO (2)

wherein R is a chain hydrocarbon having 1-10 carbon atoms.

5. The battery of claim 1, wherein the at least one organic compound having one or more isocyanato groups is at least one member selected from the group consisting of 1,2-diisocyanatoethane, 1,3-diisocyanatopropane, 1,4-diisocyanatobutane, 1,5-diisocyanatopentane, 1,6-diisocyanatohexane, 1-7-diisocyanatoheptane, and 1,8-diisocyanatooctane.

6. The battery of claim 1, wherein the at least one organic compound having one or more isocyanato groups is at least one member selected from the group consisting of 1,2-diisocyanatoethane, 1,3-diisocyanatopropane, 1,4-diisocyanatobutane, 1,5-diisocyanatopentane, 1-7-diisocyanatoheptane, and 1,8-diisocyanatooctane.

7. The battery of claim 1, wherein the at least one organic compound having one or more isocyanato groups is 1,6-diisocyanatohexane.

8. The battery of claim 1, wherein the at least one organic compound having one or more isocyanato groups has been added in an amount of 0.01% to 10% by weight based on the total weight of the nonaqueous electrolyte.

9. The battery of claim 1, wherein the amino compound having at least one amino group is at least one member selected from the group consisting of a compound represented by the chemical formula (3), a compound represented by the chemical formula (4), and a mixture thereof:

R—NH$_2$ (3)

NH$_2$—R—NH$_2$ (4)

wherein R is a chain hydrocarbon having 1-10 carbon atoms.

10. The battery of claim 1, wherein the amino compound having at least one amino group is at least one member selected from the group consisting of 1,2-diaminoethane, 1,3-diaminopropane, 1,4-diaminobutane, 1,5-diaminopentane, 1,6-diaminohexane, 1,7-diaminoheptane, and 1,8-diaminooctane.

11. The battery of claim 1, wherein the amino compound having at least one amino group is 1,6-diaminohexane.

12. The battery of claim 1, wherein the total content of the at least one organic compound having one or more isocyanato groups and the amino compound having at least one amino groups is from 0.01% to 10% by weight based on the total weight of the nonaqueous electrolyte.

13. The battery of claim 1, wherein the nonaqueous electrolyte contains γ-butyrolactone.

14. The battery of claim 1, wherein the negative active material is a lithium-titanium composite oxide.

15. The battery of claim 1, wherein the negative active material comprises at least one lithium-iron composite sulfide.

16. The battery of claim 1, wherein the positive electrode includes a positive active material, and wherein the positive active material comprises a lithium-transition metal composite oxide containing manganese or iron.

17. The battery of claim 16, wherein the lithium-transition metal composite oxide is a particulate material and comprises an oxide of at least one element selected from Al, Mg, Zr, B, Ti, and Ga, wherein the oxide is adherent to a part of a surface of the particulate material of the lithium-transition metal composite oxide.

18. The battery of claim 1, wherein the negative electrode comprises a lithium-titanium composite oxide and the positive electrode comprises at least one lithium-transition metal composite oxide containing manganese or iron.

19. The battery of claim 1, which has a separator between the positive electrode and the negative electrode, wherein the separator comprises cellulose.

\* \* \* \* \*